United States Patent
Kudo et al.

(10) Patent No.: US 10,850,790 B2
(45) Date of Patent: Dec. 1, 2020

(54) STRADDLE-TYPE VEHICLE

(71) Applicant: HONDA MOTOR CO., LTD., Tokyo (JP)

(72) Inventors: Tomohiro Kudo, Wako (JP); Shota Yamasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 85 days.

(21) Appl. No.: 16/088,842

(22) PCT Filed: Feb. 3, 2017

(86) PCT No.: PCT/JP2017/003956
§ 371 (c)(1),
(2) Date: Sep. 27, 2018

(87) PCT Pub. No.: WO2017/169105
PCT Pub. Date: Oct. 5, 2017

(65) Prior Publication Data
US 2019/0118896 A1  Apr. 25, 2019

(30) Foreign Application Priority Data

Mar. 30, 2016 (JP) .................. 2016-068766

(51) Int. Cl.
*B62K 19/30* (2006.01)
*B62J 9/00* (2020.01)
(Continued)

(52) U.S. Cl.
CPC ................ *B62K 19/30* (2013.01); *B62J 9/00* (2013.01); *B62J 35/00* (2013.01); *B62K 11/02* (2013.01); *B62K 19/38* (2013.01)

(58) Field of Classification Search
CPC ........ B62K 19/30; B62K 11/02; B62K 19/38; B62J 9/00; B62J 35/00
See application file for complete search history.

(56) References Cited

U.S. PATENT DOCUMENTS 8,540,046 B2 * 9/2013 Ishikawa ............... B62K 11/02
                                                        180/220
9,150,276 B2   10/2015 Niimi
(Continued)

FOREIGN PATENT DOCUMENTS

| JP | 07-047985 | 2/1995 |
| JP | 07-309275 | 11/1995 |

(Continued)

OTHER PUBLICATIONS

Japanese Office Action for Japanese Patent Application No. 2018-508487 dated Dec. 10, 2019.
(Continued)

*Primary Examiner* — Jacob D Knutson
*Assistant Examiner* — Michael R Stabley
(74) *Attorney, Agent, or Firm* — Amin, Turocy & Watson, LLP

(57) ABSTRACT

An electrical component box disposed from above to below a main frame, and a fuel tank disposed in the upper part of the main frame and above the electrical component box, are arranged to the vehicle rear with respect to a head pipe comprising a motorcycle. In this case, the top of the electrical component box is open. In the gap between the electrical component box and the fuel tank, a gap cover is arranged to hide the gap from the outside.

8 Claims, 4 Drawing Sheets

(51) Int. Cl.
  *B62K 19/38*  (2006.01)
  *B62J 35/00*  (2006.01)
  *B62K 11/02*  (2006.01)

(56) References Cited

U.S. PATENT DOCUMENTS

| | | | |
|---|---|---|---|
| 9,493,067 B2 | 11/2016 | Kawai | |
| 2013/0032426 A1 | 2/2013 | Ishikawa et al. | |
| 2015/0041232 A1* | 2/2015 | Takatsuka | B62K 19/38 |
| | | | 180/219 |

FOREIGN PATENT DOCUMENTS

| | | |
|---|---|---|
| JP | 2013-032128 | 2/2013 |
| JP | 2013-252807 | 12/2013 |
| JP | 2015-085844 | 5/2015 |
| WO | 2013/001712 | 1/2013 |

OTHER PUBLICATIONS

International Search Report and Written Opinion for International Application No. PCT/JP2017/003956 dated Apr. 4, 2017, 9 pages.
Indian Office Action for Indian Patent Application No. 201847040863 dated Jul. 2, 2020.

* cited by examiner

STRADDLE-TYPE VEHICLE

TECHNICAL FIELD

The present invention relates to a saddle-type vehicle (straddle-type vehicle) in which an electric equipment case and a fuel tank are provided on a frame extending rearward of the vehicle from a head pipe.

BACKGROUND ART

For example, according to the disclosure of Japanese Laid-Open Patent Publication No. 2013-032128, an electric equipment case modeled after a fuel tank is provided on an upper side of a frame extending rearward of a vehicle from a head pipe. In this structure, in an attempt to improve waterproof performance of a breaker placed in the electric equipment case and reduce external forces applied to the breaker, an opening of the electric equipment case is covered by a cover member in a manner that the opening can be opened/closed.

SUMMARY OF INVENTION

However, in the case where the opening of the electric equipment case is covered by the cover member, since a space inside the electric equipment case has a hermetical structure, there is a concern that heat releasing performance of electric equipment such as the breaker is degraded.

Therefore, in order to achieve a desired heat releasing performance, it may be possible to adopt a non-hermetical structure, e.g., by partially opening the electric equipment case. In this case, the inside of the electric equipment case is visible from the outside through the opened part, and thus there is a concern that the outer appearance is impaired. Further, water and dust may enter the electric equipment case from the outside through the opened part.

In view of the above, an object of the present invention is to provide a saddle-type vehicle which makes it possible to improve outer appearance, water proof performance, and dust proof performance.

A saddle-type vehicle according to the present invention includes a frame extending rearward of the vehicle from a head pipe, and an electric equipment case and a fuel tank disposed on the frame. The saddle-type vehicle has the following aspects:

First feature: The electric equipment case is disposed behind the head pipe so as to extend from an upper side to a lower side of the frame, and the fuel tank is disposed on an upper portion of the frame and above the electric equipment case, behind the head pipe. In this case, upper part of the electric equipment case is opened, and a gap cover is provided at a gap between the electric equipment case and the fuel tank. The gap cover is configured to hide the gap from the outside.

Second feature: The gap cover is provided on a vehicle lateral side of the electric equipment case.

Third feature: The gap cover is configured to extend into the inside of the fuel tank, above the electric equipment case, and at least part of the gap cover is overlapped with the fuel tank in a side view of the saddle-type vehicle.

Fourth feature: An opening is provided on the vehicle front side of the electric equipment case, and the opening is configured to allow passage of a wire harness and/or a hose therethrough.

Fifth feature: The hose is a brake hose.

According to the first feature of the present invention, since the upper part of the electric equipment case is opened, it is possible to achieve a desired heat release performance of electric equipment contained in the electric equipment case. Further, since the electric equipment case is disposed so as to extend from an upper side to a lower side of the frame, and the fuel tank is disposed on an upper portion of the frame and above the electric equipment case, the fuel tank prevents entry of water and dust from above the vehicle.

On the other hand, in such a structure, a gap is formed between the electric equipment case and the fuel tank. Therefore, the inside of the electric equipment case might be visible from the outside through the gap, or the surroundings in the viewing direction might be visible from the outside through the gap. Further, water and dust might enter the electric equipment case from the outside through the gap.

In order to address the problem, in the first feature, the gap cover hides the gap between the electric equipment case and the fuel tank from the outside. In this manner, it is possible to improve outer appearance of the saddle-type vehicle, and by preventing entry of water and dust from the outside, water proof performance and dust proof performance can be improved.

According to the second feature of the present invention, the gap cover is provided on a vehicle lateral side of the electric equipment case. In this manner, it is possible to improve water proof performance, and also improve outer appearance on the lateral side of the vehicle which is likely to be visible from the outside.

According to the third feature of the present invention, the gap cover enters into the interior of the fuel tank in a manner that at least part of the gap cover is overlapped with the fuel tank. Therefore, it is possible to efficiently prevent entry of water droplets and dust into the electric equipment case from the outside.

According to the fourth feature of the present invention, the wire harness and/or the hose pass through the opening provided on the vehicle front side of the electric equipment case. Thus, the wire harness and/or the hose pass through a position adjacent to the center of rotation of the head pipe. In the structure, it is possible to reduce load (twist force) applied to the wire harness and/or the hose when the ride rotates the handlebars of the saddle-type vehicle.

According to the fifth feature of the present invention, the brake hose passes through a position adjacent to the center of rotation of the head pipe. In the structure, it is possible to reduce load applied to the brake hose when the rider rotates the handlebars.

DESCRIPTION OF EMBODIMENTS

A preferred embodiment of a saddle-type vehicle according to the present invention will be described below in detail with reference to the accompanying drawings.

[Schematic Structure of Motorcycle 10]

Figure 1:
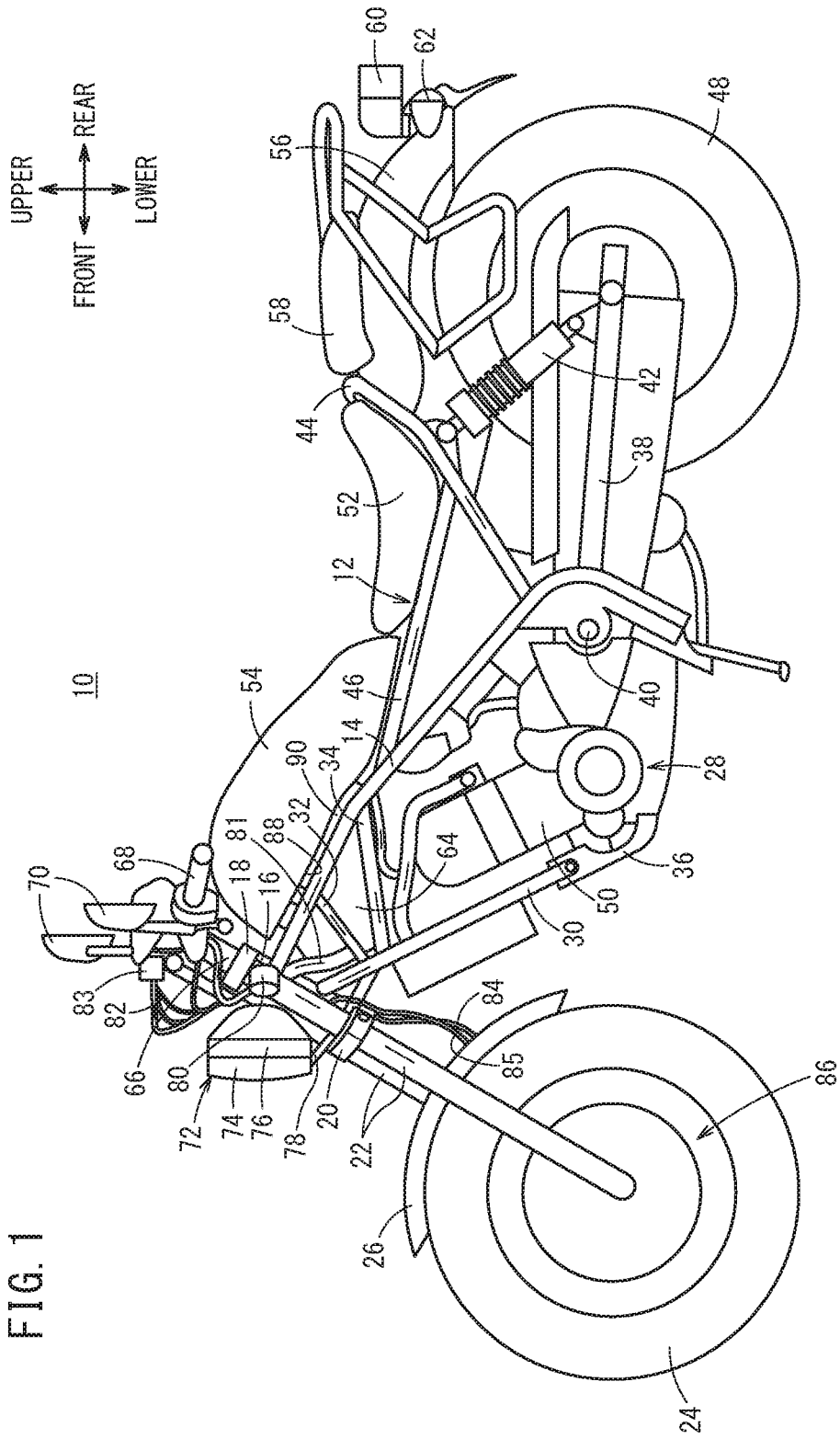
FIG. 1 is a left side view showing a motorcycle according to an embodiment of the present invention.

FIG. 1 is a left side view schematically showing a structure of a motorcycle 10 as a saddle-type vehicle according to the embodiment of the present invention. It should be noted that, in the following description, the traveling direction of the motorcycle 10 is defined as the "front/forward" direction, and the terms "front/rear (frontward/rearward)" "left/right", and "upper/lower" directions will be used based on this definition.

In the motorcycle 10, a head pipe 16 is provided at a front end of a main frame 14 of a vehicle body frame 12. The head pipe 16 supports a steering stem (not shown) in a pivotable manner. A top bridge 18 is fixed to an upper end of the steering stem, and a bottom bridge 20 is fixed to a lower end of the steering stem. The top bridge 18 and the bottom bridge 20 support a pair of left and right front forks 22. A front wheel 24 is supported by lower ends of the front forks 22 so as to be rotatable about the wheel axis. A front fender 26 is attached to the front forks 22 over the front wheel 24.

A hanger frame 30 is provided on the front side of the main frame 14. The hanger frame 30 supports an engine 28 on the front side of the main frame 14. The front side of the main frame 14 and the upper side of the hanger frame 30 are coupled together by a plurality of support frames 32, 34. A bracket 36 is fixed to a lower end of the hanger frame 30. The bracket 36 couples the hanger frame 30 and the engine 28 together. The rear side of the main frame 14 is curved downward, and a pivot 40 is provided at a position ahead of the curved portion of the main frame 14. The pivot 40 supports a swing arm 38 in a swingable manner about the pivot.

The rear side of the swing arm 38 is supported by a rear frame 44 through a pair of left and right rear cushions 42. The rear frame 44 is connected to a rear portion of the main frame 14. The rear frame 44 is coupled to the rear side of the curved portion of the main frame 14. A portion of the main frame 14 above the engine 28 and an intermediate portion of the rear frame 44 are coupled together by a support frame 46.

A rear wheel 48 serving as a drive wheel is supported on a rear end of the swing arm 38 so as to be rotatable about the wheel axis. The rotational driving force generated by the engine 28 is transmitted to the rear wheel 48 through a drive chain (not shown).

The engine 28 is fixed to a position surrounded by the main frame 14, the hanger frame 30, the bracket 36, and the pivot 40. A muffler (not shown) is attached to the front side of a cylinder block 50 of the engine 28. The muffler is coupled to an exhaust pipe provided on the rear side. A fuel injector (not shown) and an air cleaner box (not shown) are connected to the rear side of the cylinder block 50. Further, a driver's seat 52 is supported by the rear frame 44 and the support frame 46, and the rear cushions 42 are supported by the rear frame 44.

A fuel tank 54 is attached to the main frame 14, above the engine 28. The fuel tank 54 has a shape straddling the main frame 14 at the center of the vehicle body in the left-right direction (vehicle width direction). The driver's seat 52 is provided behind the fuel tank 54. A rear fender 56 is provided behind the driver's seat 52 and the rear frame 44. A passenger's seat 58, a tail lamp 60, and a pair of left and right rear blinkers 62 are attached to the rear fender 56.

The fuel tank 54 is provided on an upper portion of the main frame 14 behind the head pipe 16. An electric equipment box 64 (electric equipment case) containing electric equipment of the motorcycle 10 is disposed behind the head pipe 16 so as to extend from an upper side to a lower side of the main frame 14. The fuel tank 54 is provided on the main frame 14 such that the fuel tank 54 covers the electric equipment box 64 from above. Further, in the state where the fuel tank 54 and the electric equipment box 64 are formed integrally, the fuel tank 54 and the electric equipment box 64 are provided on the main frame 14.

In a side view of FIG. 1, a substantially triangular space is formed adjacent to the head pipe 16, by the main frame 14, the hanger frame 30, and the support frame 34. The electric equipment box 64 is disposed in the substantially triangular space surrounded by the pair of left and right main frames 14, the pair of hanger frames 30, and the pair of support frames 34. Therefore, in the side view of FIG. 1, the electric equipment box 64 has a substantially triangular shape.

Examples of electric equipment contained in the electric equipment box 64 include an ignition coil, an ignition key, a joint connector for connection between circuits, an ECU for controlling the engine 28, various relays (blinker relay, pump relay, fan relay, ignition relay), a bank angle sensor, and various couplers. It should be noted that these components are merely examples, and other components of electric equipment may be contained in the electric equipment box 64. Since these components of the electric equipment are known, the detailed description thereof is omitted.

A pair of left and right handlebar fixing units 66 are provided at an upper portion of the top bridge 18, and steering handlebars 68 are attached to the handlebar fixing units 66, respectively. Rearview mirrors 70 are attached to the pair of left and right steering handlebars 68, respectively.

A head light 72 is provided on the front side of the head pipe 16. The head light 72 includes a head light cover 74 and a housing 76. The head light 72 is fixedly supported on a bottom bridge 20. In the structure, a support member 78 extends rearward and obliquely downward from a lower portion of the head light cover 74, and a front end of the support member 78 is fixed to the bottom bridge 20. Thus, the head light 72 is supported on the front side of the head pipe 16. The blinkers 80 are attached to the pair of left and right front forks 22, respectively, on the left and right sides of the head light 72.

The electric equipment outside the electric equipment box 64 such as the head light 72 and the blinkers 80, and the electric equipment inside the electric equipment box 64 (e.g., ECU) are connected together through a wire harness 81. For example, the wire harness 81 is drawn from the front side of the electric equipment box 64, and installed so as to be connected to the head light 72 and the blinkers 80.

Further, brake hoses 82, 84 and another wire harness 85 are drawn out from the front side of the electric equipment box 64. The brake hose 82 is connected to a master cylinder 83 attached to the right steering handlebar 68. Further, the other brake hose 84 is connected to a front wheel brake device 86. The brake hoses 82, 84 are coupled together in the electric equipment box 64. The other wire harness 85 is connected to a vehicle velocity sensor (not shown) provided adjacent to the front wheel brake device 86.

In the structure, when the rider operates a front wheel brake lever (not shown) provided at the steering handlebar 68, braking fluid pressure is applied from the master cylinder 83 to the front wheel brake device 86 through the brake hoses 82, 84, and a braking force is applied to the front wheel 24. Further, the vehicle velocity of the motorcycle 10 detected by a vehicle velocity sensor is outputted to the ECU through the wire harness 85.

[Characteristic Structure of the Embodiment of the Present Invention]

Next, a characteristic structure of the motorcycle 10 according to the embodiment of the present invention will be described with reference to FIGS. 2 to 4. As necessary, the embodiment will be described with reference to FIG. 1 as well.

As described above, the electric equipment box 64 is disposed behind the head pipe 16 so as to extend from upper to lower positions of the main frame 14. The fuel tank 54 is provided on an upper portion of the main frame 14 and above the electric equipment box 64. With the characteristic structure of the motorcycle 10 according to the embodiment of the present invention, upper part of the electric equipment box 64 is opened, and a gap cover 90 is provided at a gap 88 between the electric equipment box 64 and the fuel tank 54 in order to hide the gap 88 from the outside.

Figure 2:
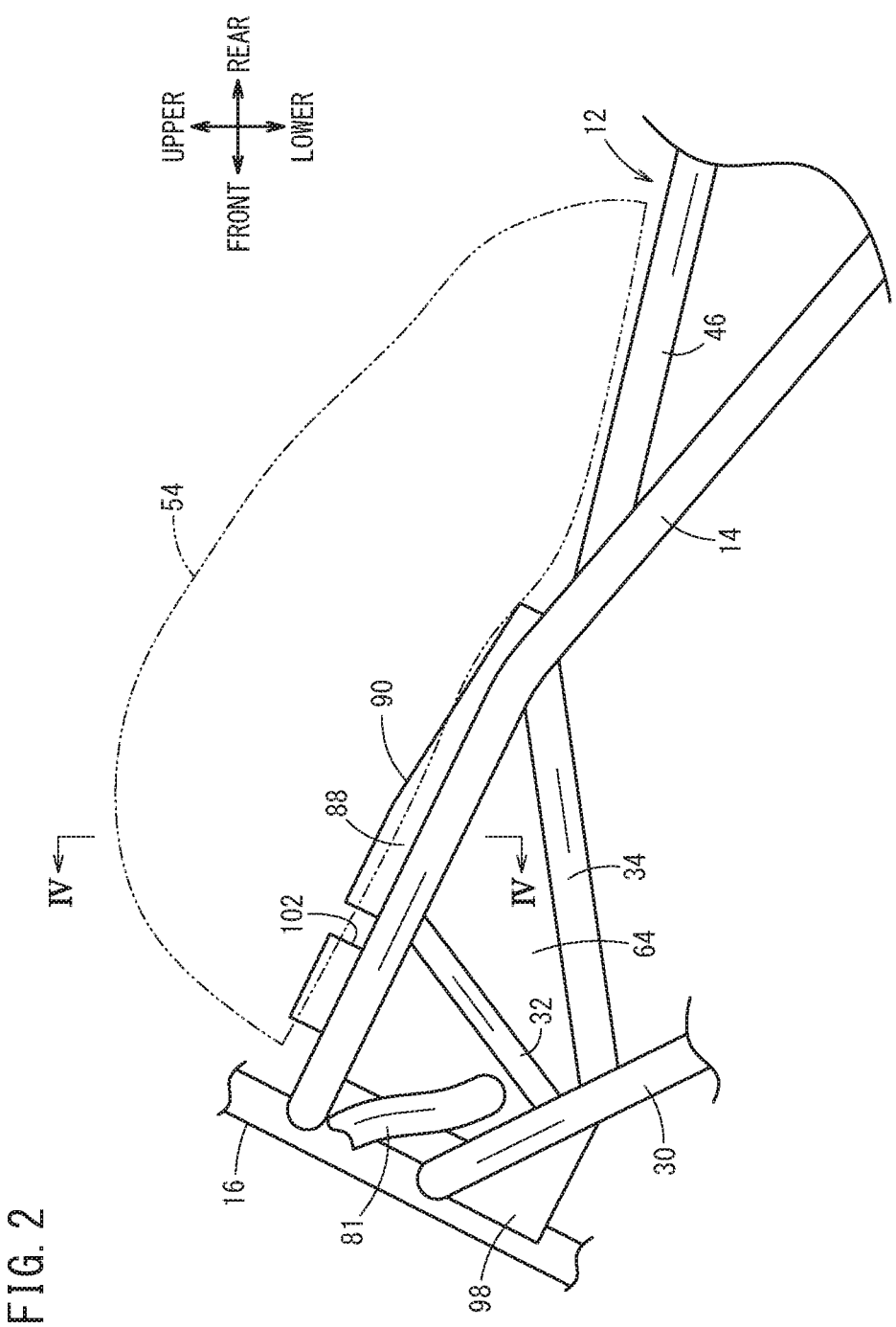
FIG. 2 is a left side view in which an area around an electric equipment box in FIG. 1 is enlarged.
Figure 3:
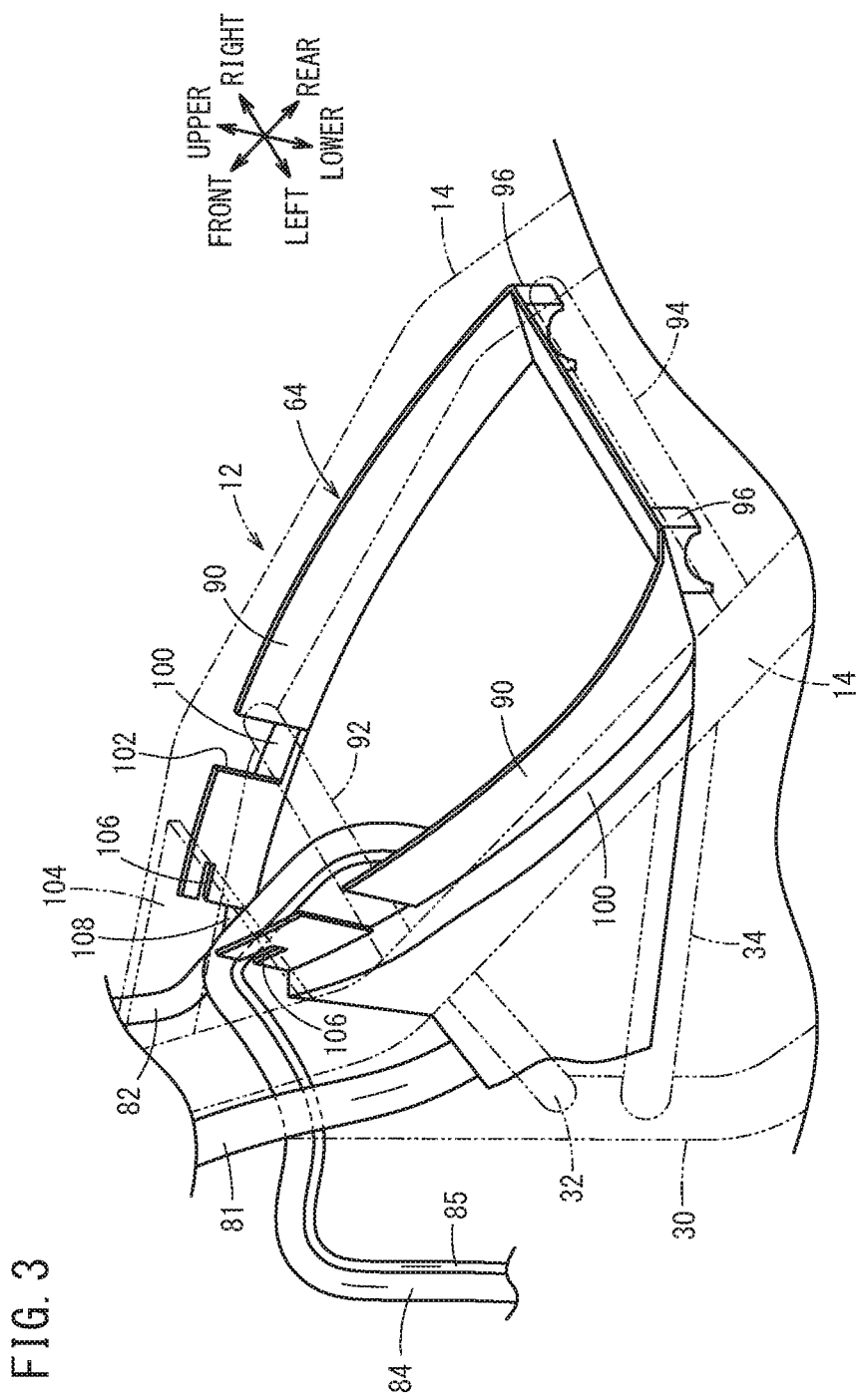
FIG. 3 is a perspective view showing the electric equipment box in FIG. 2.

As shown in FIGS. 2 and 3, the pair of left and right main frames 14 extend rearward from the head pipe 16, and the support frames 32, 34 are provided on portions of the main frames 14 that are adjacent to the head pipe 16. The support frames 32, 34 couple the main frame 14 and the hanger frame 30. Further, portions of the main frames 14 jointed to the support frames 32 are coupled together by another support frame 92 extending in the left-right direction. Moreover, portions of the main frames 14 joined to the support frames 34 are coupled together by another support frame 94 extending in the left-right direction.

In this case, the electric equipment box 64 is disposed in a space inside the motorcycle 10, defined by the head pipe 16, the pair of left and right main frames 14, the support frames 32, 34, and the other support frames 92, 94.

Specifically, engagement members 96 are provided on the rear side of the electric equipment box 64. The engagement members 96 have a shape corresponding to the outer peripheral surface of the support frame 94, and the engagement members 96 are engaged with the support frame 94. A support member 98 is provided on a lower portion of the head pipe 16. The support member 98 extends rearward of the vehicle, and supports the bottom of the electric equipment box 64 on the vehicle front side.

Figure 4:
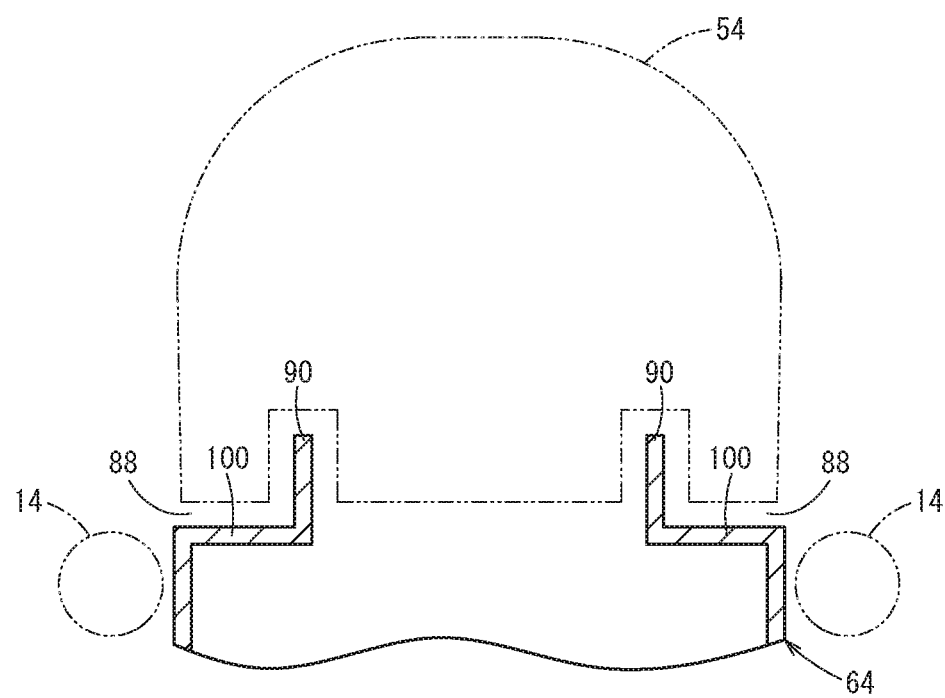
FIG. 4 is a schematic cross sectional view taken along line IV-IV in FIG. 2.
Figure 4:
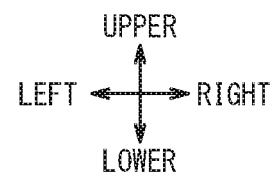

Further, as shown in FIGS. 3 and 4, left and right sides of the electric equipment box 64 extending in the front/rear direction include upper ends 100 which slightly extend inward. Therefore, upper part of the electric equipment box 64 is opened. In the structure, the gap cover 90 extends upward from the inner end portions of the upper ends 100.

The fuel tank 54 is disposed on an upper portion of the main frame 14 so as to cover the electric equipment box 64 from above. Both of left and right sides of the fuel tank 54 and side portions of the electric equipment box 64 are substantially flush with each other, and the gap 88 is formed between both of the left and right sides of the fuel tank 54 and the upper ends 100 of the electric equipment box 64.

In this case, the gap cover 90 extends into the inside of the fuel tank 54 at the upper ends 100 of the electric equipment box 64, and extends upward beyond the lower end positions of both of left and right sides of the fuel tank 54. Therefore, when the gap 88 is viewed from the outside, the gap cover 90 and the fuel tank 54 are overlapped with each other, and the gap cover 90 covers the gap 88.

Further, a cutout 102 is formed in each of a pair of left and right portions of the gap cover 90, at positions corresponding to the support frame 92. The support frame 92 is inserted into the cutout 102. Further, a substantially triangular support member 104 extends rearward of the vehicle from a portion where the head pipe 16 and the main frame 14 are coupled together. In the structure, a cutout 106 configured to be fitted to the support member 104 is formed, along the front/rear direction, at each of the front ends of the gap cover 90.

Therefore, by the main frames 14, the hanger frames 30, the support frames 32, 34, 92, 94, and the support members 98, 104, the electric equipment box 64 is fixedly supported within the above space in the state where the electric equipment box 64 is positioned in the vertical, left/right, and front/rear directions.

As shown in FIG. 3, a pair of left and right front ends of the gap cover 90 are not coupled together. Therefore, an opening 108 is formed between the front ends of the gap cover 90. In the structure, the brake hoses 82, 84 pass through the opening 108 to connect the master cylinder 83 and the front wheel brake device 86. Further, the wire harness 85 passes through the opening 108 to connect the ECU and the vehicle velocity sensor.

Advantages of the Embodiment of the Present Invention

As described above, in the motorcycle 10 according to the embodiment of the present invention, the electric equipment box 64 is disposed behind the head pipe 16 so as to extend from an upper side to a lower side of the main frame 14, and the fuel tank 54 is disposed on an upper portion of the main frame 14 and above the electric equipment box 64. The upper part of the electric equipment box 64 is opened, and the gap cover 90 hiding the gap 88 from the outside is provided at the gap 88 between the electric equipment box 64 and the fuel tank 54.

As described above, since the upper part of the electric equipment box 64 is opened, it is possible to achieve a desired heat release performance of the electric equipment contained in the electric equipment box 64. Further, the electric equipment box 64 is disposed so as to extend from an upper portion to a lower portion of the main frame 14, and the fuel tank 54 is disposed on an upper side of the main frame 14 and above the electric equipment box 64, and thus the fuel tank 54 prevents entry of water and dust from above the vehicle by.

On the other hand, in such a structure, the gap 88 is formed between the electric equipment box 64 and the fuel tank 54. Therefore, the inside of the electric equipment box 64 may be visible from the outside through the gap 88, or the surroundings in the viewing direction may be visible from the outside through the gap 88. Consequently, there is a concern the outer appearance of the motorcycle 10 might be impaired. Further, water and dust might enter the electric equipment box 64 from the outside through the gap 88.

In order to address the problem, in the motorcycle 10 according to the present embodiment, the gap 88 between the electric equipment box 64 and the fuel tank 54 is hidden by the gap cover 90 from the outside. With this structure, it is possible to improve outer appearance of the motorcycle 10, and by preventing entry of the water and dust from the outside, water proof performance and dust proof performance are improved.

In this case, the gap cover 90 is provided on vehicle lateral sides of the electric equipment box 64. Therefore, it becomes possible to improve water proof performance, and also improve outer appearance of the vehicle lateral sides which are likely to be visible from the outside.

Further, the gap cover 90 is configured to extend into the inside of the fuel tank 54, above the electric equipment box 64. At least part of the gap cover 90 is overlapped with the fuel tank 54 in a side view of the motorcycle 10. Therefore, it is possible to efficiently prevent entry of water droplets and dust into the electric equipment box 64 from the outside.

Further, the opening 108 is provided on the vehicle front side of the electric equipment box 64 for allowing the wire harness 85 and/or the brake hoses 82, 84 to pass through the opening 108. In the structure, the wire harness 85 and/or the brake hoses 82, 84 pass by the center of rotation of the head pipe 16. As a result, it is possible to reduce load (twist force) applied to the wire harness 85 and/or the brake hoses 82, 84 when the rider rotates the steering handlebars 68 of the motorcycle 10.

While the present invention has been described in connection with the preferred embodiment, the technical scope of the present invention is not limited to the scope of features in the description of the embodiment. It is apparent to those skilled in the art that various modifications or improvements may be made to the above embodiment. It is apparent from the description of the claims that the resulting embodiments with such modifications or improvements may fall within the technical scope of the present invention. In the claims, reference numerals in parenthesis are added in line with reference numerals in the accompanying drawings for ease of understanding the present invention, and shall not be construed to limit the present invention to the constituent elements labeled with such reference numerals.

What is claim is:

1. A saddle vehicle comprising:
    a frame extending rearward of the vehicle from a head pipe; and
    an electric equipment case and a fuel tank disposed on the frame,
    wherein the electric equipment case is disposed behind the head pipe so as to extend from an upper side to a lower side of the frame,
    wherein the fuel tank is disposed on an upper portion of the frame and above the electric equipment case, behind the head pipe,
    wherein an upper part of the electric equipment case is opened,
    wherein a gap cover is provided at a gap between the electric equipment case and the fuel tank and the gap cover is configured to hide the gap from outside,
    wherein an upper end of the electric equipment case extends inward forming an inner end portion, and
    wherein the gap cover extends upward from the inner end portion.

2. The saddle vehicle according to claim 1, wherein the gap cover is provided on a vehicle lateral side of the electric equipment case.

3. The saddle vehicle according to claim 1, wherein an opening is provided at a front end of the gap cover.

4. The saddle vehicle according to claim 1, wherein the opening is configured to allow passage of a wire harness therethrough.

5. The saddle type saddle vehicle according to claim 4, wherein the opening is further configured to allow passage of the wire harness and a hose therethrough.

6. The saddle vehicle according to claim 3, wherein the opening is configured to allow passage of a hose therethrough.

7. The saddle vehicle according to claim 6, wherein the hose comprises a brake hose.

8. The saddle vehicle according to claim 1,
    wherein the gap cover is configured to extend into an inside of the fuel tank, above the electric equipment case, and
    wherein at least part of the gap cover is overlapped with the fuel tank in a side view of the saddle vehicle.

* * * * *